(12) United States Patent
Tanaka

(10) Patent No.: US 7,540,673 B2
(45) Date of Patent: Jun. 2, 2009

(54) CAMERA SYSTEM

(75) Inventor: Hiroshi Tanaka, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 572 days.

(21) Appl. No.: 11/418,302

(22) Filed: May 5, 2006

(65) Prior Publication Data

US 2006/0257142 A1    Nov. 16, 2006

(30) Foreign Application Priority Data

May 12, 2005  (JP) ............................. 2005-140009

(51) Int. Cl.
*G03B 17/00* (2006.01)
*H04N 5/225* (2006.01)
(52) U.S. Cl. .................................. 396/529; 348/220.1
(58) Field of Classification Search ................ 396/439, 396/529, 530, 531, 532; 348/207.99, 220.1, 348/335
See application file for complete search history.

(56) References Cited

U.S. PATENT DOCUMENTS

2001/0030707 A1* 10/2001 Fujii ........................... 348/335

2002/0051643 A1* 5/2002 Nakashita ................... 396/429
2005/0253934 A1* 11/2005 Yamagishi et al. ......... 348/222.1

FOREIGN PATENT DOCUMENTS

| JP | 10-191122 A | 7/1998 |
|---|---|---|
| JP | 2000-50138 A | 2/2000 |
| JP | 2000-106640 A | 4/2000 |
| JP | 2000-152070 A | 5/2000 |

* cited by examiner

*Primary Examiner*—Rodney E Fuller
(74) *Attorney, Agent, or Firm*—Sughrue Mion, PLLC

(57) ABSTRACT

A camera system has an optical unit having an image-taking optical system and a camera main unit to which the optical unit is detachably attached. The camera main unit has a detection section which detects attachment and detachment of the optical unit; a data processing section which has two or more modes including a shooting mode for obtaining image data; a mode setting section which sets a mode according to an operation; and a mode switching section which switches a mode to a mode other than the shooting mode thereby entering a standby state when detachment of the optical unit is detected by the detection section during the shooting mode being set by the mode setting section, and which switches a mode back to the shooting mode when attachment of the optical unit is detected by the detection section during the standby state.

3 Claims, 6 Drawing Sheets

CAMERA SYSTEM

BACKGROUND OF THE INVENTION

1. Field of the Invention

The present invention relates to a camera system including: an optical unit having an image-taking optical system for forming an image based on subject light; and a camera main unit to which the camera unit is detachably attached and which applies predetermined signal processing to image data.

2. Description of the Related Art

Conventionally, there is known a lens-interchangeable camera composed of: a camera main unit having an imaging device; and an interchangeable lens unit having a shooting lens and attached to the camera main unit when the camera is in use. In this type of camera, subject light coming through the shooting lens of the lens unit is received on the imaging device of the camera main unit so that the imaging device can generate image data representing an image based on the subject light. This type of camera has the advantage of reusing interchangeable shooting lenses conventionally employed in a single-lens reflex camera that records an image on a silver-salt film.

In this case however, if, for example, a large expensive shooting lens having an excellent optical property is attached to a camera main unit containing a small low-solution imaging device, the shooting lens capable of precisely forming an image based on subject light cannot be fully utilized because the imaging device is incapable of reading the subject light accurately. To solve this problem, there is developed a lens-interchangeable camera composed of: a camera main unit; and a lens unit having a shooting lens and imaging device and attachable to the camera main unit (for example, refer to Japanese Patent Application Publications No. 10-191122, No. 2000-50138 and No. 2000-106640). According to the lens-interchangeable cameras disclosed in these publications, the lens unit has a built-in charge-coupled device (CCD) suitable for the size and optical property of a shooting lens, thereby obtaining a high-quality image by making full use of abilities of the shooting lens.

By the way, if a user presses the shutter button of a lens-interchangeable camera without attaching a lens unit to a camera main unit, there may be obtained a blurred image on which a subject cannot be identified. When it comes to the lens-interchangeable cameras disclosed in the above-described publications, if a user presses the shutter button without attaching the lens unit to the camera main unit, it is impossible to obtain an image because the CCD is built in the lens unit side. Considering such situations, Japanese Patent Application Publication No. 2000-152070 discloses a lens-interchangeable camera configured to switch the processing mode representing the processing by the camera to a mode other than a shooting mode upon removal of the lens unit from the camera main unit. For example, this camera forcibly switches the processing mode to a mode such as a playback mode for playing back images upon removal of the lens unit, which makes it possible to prevent occurrence of undesirable situations in which: a user obtains a useless image by pressing the shutter button without being aware of the lens unit being removed, a user misses the right moment to shoot an image, and the like.

Removal of the lens unit is likely to take place when a user wants to change the value in a zoom range etc. during shooting operation for shooting an image of a subject, and the user usually restarts the shooting operation after changing the lens unit. In this situation, it is desirable to restart the shooting operation immediately after changing the lens unit. However, such a quick restart cannot be realized by the method described in Japanese Patent Application Publication No. 2000-152070. In this method, the processing mode is switched to the playback mode etc. upon removal of the lens unit and therefore, a user needs to manually switch the playback mode to the shooting mode after changing the lens unit in order to restart the shooting operation, which requires time and effort.

SUMMARY OF THE INVENTION

In view of the foregoing, the present invention provides a camera system capable of restarting shooting immediately after changing a lens during shooting.

A camera system according to the invention includes: an optical unit having an image-taking optical system passing subject light; and a camera main unit to which the optical unit is detachably attached, wherein:

the camera main unit includes:

a detection section which detects attachment and detachment of the optical unit;

a data processing section which applies predetermined processing to image data representing an image of subject light passing through the image-taking optical system of the optical unit and which has a plurality of modes including a shooting mode for obtaining the image data;

a mode setting section which sets a mode of the data processing section according to an operation; and a mode switching section which switches a mode of the data processing section to a mode other than the shooting mode thereby entering a standby state when detachment of the optical unit is detected by the detection section during the shooting mode being set by the mode setting section, and which switches a mode of the data processing section back to the shooting mode when attachment of the optical unit is detected by the detection section during the standby state.

In the camera system of the invention, when the optical unit is removed in the state in which the shooting mode is set, the mode is switched to a mode other than the shooting mode thereby entering a standby state. When the optical unit is attached during the standby state, the mode is automatically changed to the shooting mode so that a user can immediately restart the shooting without manually changing the mode.

In the camera system according to the invention, preferably the camera main unit further includes a notification section which notifies to the outside of the camera system that the optical unit is detached, in response to a setting operation for setting the shooting mode through the mode setting section.

If a user tries to shoot an image without attaching the optical unit, there might occur an undesirable situation in which a blurred image is obtained or an image cannot be obtained by missing the right moment for shooting. It is possible to prevent occurrence of such a situation by providing the above-described notification section capable of notifying a user that the optical unit is removed.

In the camera system according to the invention, preferably, the mode switching section disables the mode setting section from setting the shooting mode during the standby state.

This additional feature makes it possible for a user to restart shooting immediately after attaching the optical unit and prevents undesirable shooting in the state when the optical unit is removed.

According to the camera system of the invention, it is possible to restart shooting immediately after changing a lens.

DETAILED DESCRIPTION OF THE INVENTION

An embodiment of the present invention will be described with reference to the accompanying drawings.

Figure 1:
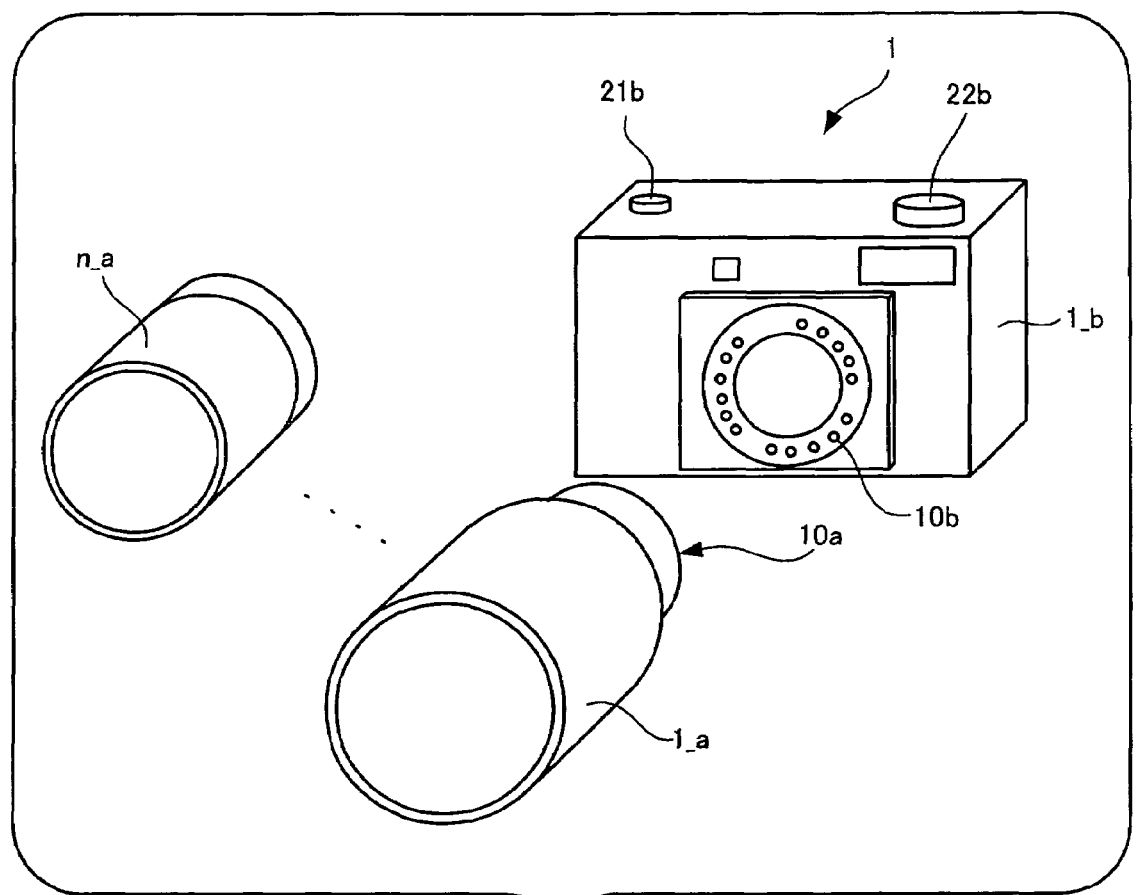
FIG. 1 is an exploded view of a camera system 1 according to an embodiment of the present invention.

FIG. 1 is an exploded view of a camera system 1 according to an embodiment of the present invention.

As shown in FIG. 1, the camera system 1 has two or more kinds of camera heads 1_a through n_a each having a shooting lens and a charge-coupled device (CCD). In the camera system 1, any one of the camera heads 1_a through n_a is selected and used. In the following description, it is assumed that the first camera head 1_a is selected from among the camera heads 1_a through n_a.

The camera system 1 is composed of the camera head 1_a and a camera main unit 1_b to which the camera head 1_a is detachably attached when used. The camera heads 1_a through n_a each correspond to an example of the "optical unit" according to the invention whereas the camera main unit 1_b corresponds to an example of the "camera main unit" according to the invention.

On the front face of the camera main unit 1b, there is provided a mount 10b on which a mount connector 10a provided at the rear of the camera head 1_a is removably mounted.

On the top surface of the camera main unit 1b, there are disposed a release button 21b and a mode setting dial 22b used for setting a processing mode (which will be described later in detail).

Figure 2:
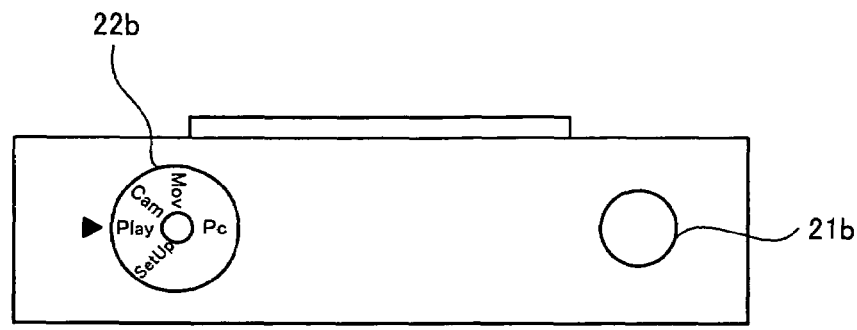
FIG. 2 is a top view of a camera main unit 1b shown in FIG. 1.

FIG. 2 is a top view of the camera main unit 1b shown in FIG. 1.

In the embodiment, the mode setting dial 22b allows a user to select any one of the following processing modes: a playback mode (Play) for displaying taken images, a still-image mode (Cam) for taking a still image, a moving-image mode (Mov) for taking a moving image, a connection mode (Pc) for connection with an external device such as personal computer, and a set-up mode (SetUp) for setting the time etc. of a clock built in the camera main unit 1b.

It is assumed here that a user is likely to change the camera head 1_a without checking which mode is selected as the processing mode by the mode setting dial 22b. In the present embodiment, even if a certain mode is selected by the mode setting dial 22b, a processing mode different from the mode selected by the mode setting dial 22b may be automatically set up inside the camera system 1 in order to perform processing suitable for a situation. A processing mode selected by the mode setting dial 22b is hereinafter referred to as a "selected mode."

Figure 3:
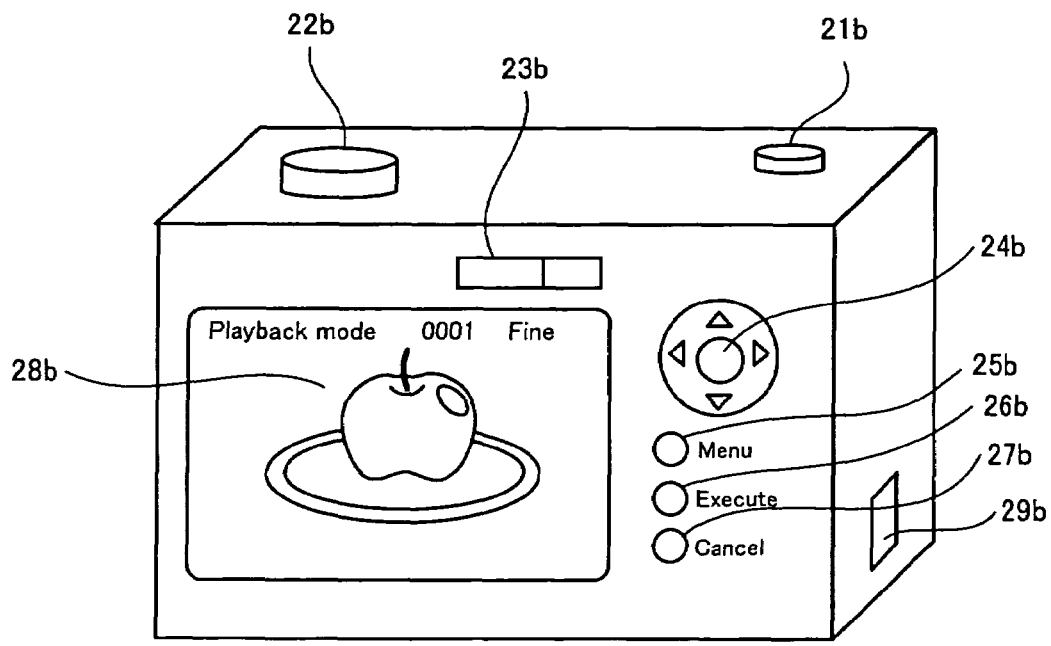
FIG. 3 is a rear view of the camera main unit 1_b shown in FIG. 1.

FIG. 3 is a rear view of the camera main unit 1_b shown in FIG. 1.

On the back of the camera main unit 1_b, there are disposed a power switch 23b used to power on the camera system 1, a liquid crystal display (LCD) 28b for displaying images, menu screens, etc., a cross key 24b used to select an item etc. in a menu screen displayed on the LCD 28b, a menu button 25b used to display a menu screen on the LCD 28b, an execute button 26b used to determine contents to be set, and a cancel button 27b used to cancel the set contents. On a flank of the camera main unit 1_b, there is disposed a USB connector 29b used to connect the camera main unit 1_b to an external device such as personal computer. The LCD 28b corresponds to an example of the "notification section" according to the invention.

Figure 4:
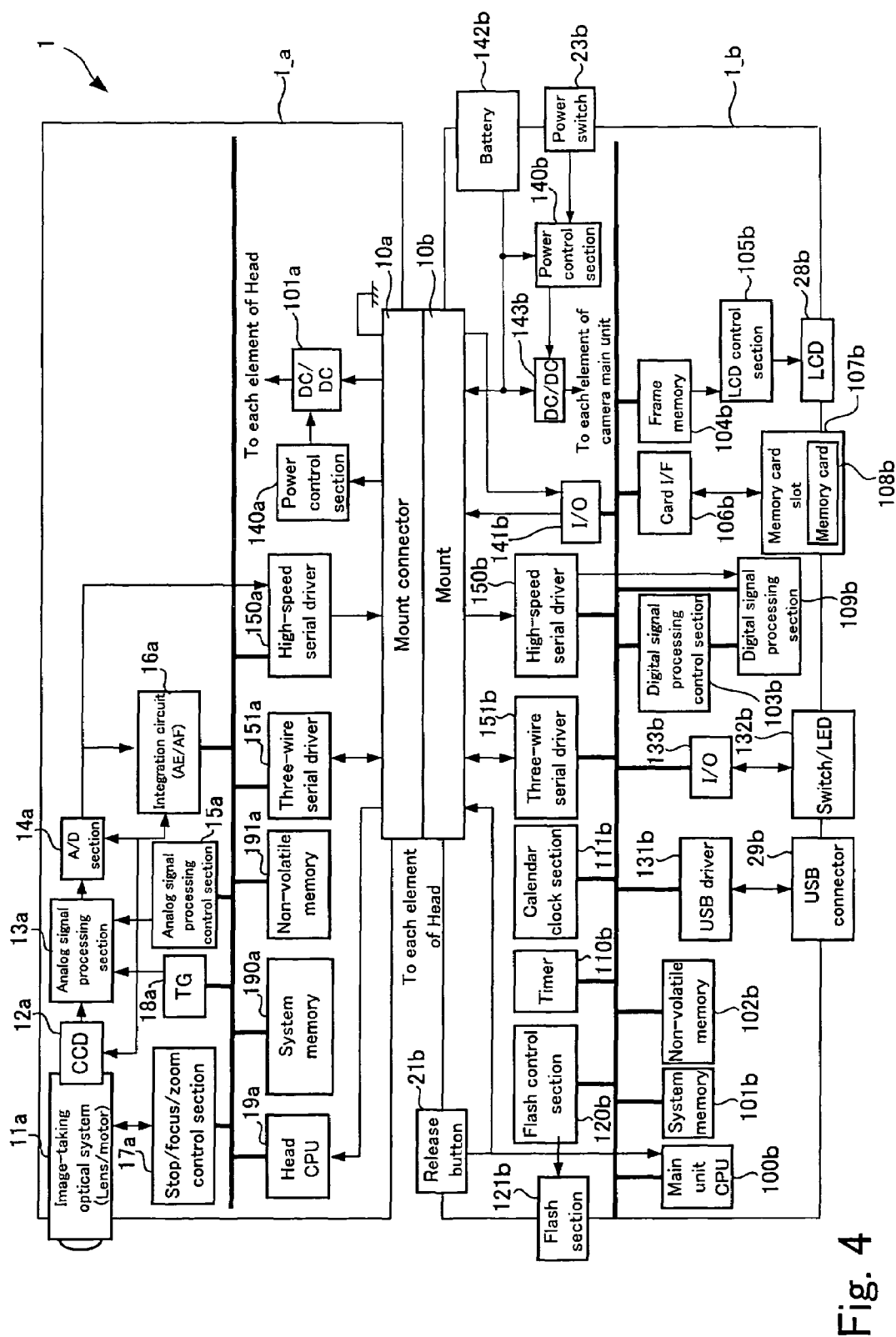
FIG. 4 is a diagram showing an internal structure of the camera system 1 shown in FIG. 1.

FIG. 4 is a diagram showing an internal structure of the camera system 1 shown in FIG. 1.

First, the camera head 1_a will be described.

The camera head 1_a is provided with: an image-taking optical system 11a that includes components such as various lenses including a focus lens and a zoom lens and a motor for driving the various lenses; a stop/focus/zoom control section 17a that serves to control positions of the focus lens and the zoom lens and to control a diameter of the aperture by controlling the motor of the image-taking optical system 11a; a CCD 12a that generates image signals representing an image based on subject light upon receipt of the subject light coming through the image-taking optical system 11a; an analog signal processing section 13a that performs processing including amplification and gain adjustment of the image signals; an A/D section 14a that converts the image signals in analog form into image data in digital form; and an analog signal processing control section 15a that controls the analog signal processing section 13a. The camera head 1_a is further provided with: a timing generator (TG) 18a that generates timing signals to the CCD 12a, analog signal processing section 13a and A/D section 14a; a head CPU 19a that controls various elements composing the camera head 1_a and calculates positions of the focus lens and the zoom lens; a system memory 190a that serves as a temporary memory used by the head CPU 19a at the time of calculation processing; and a non-volatile memory 191a that stores lens parameters including the pixel number of the CCD 12a and lens aperture values. The image-taking optical system 11a corresponds to the "image-taking optical system" according to the invention.

The camera head 1_a is further provided with: a three-wire serial driver 151a and a high-speed serial driver 150a. Similar drivers are also provided in the camera main unit 1_b as will be described later. The three-wire serial driver 151a serves to exchange data with the camera main unit 1_b. The camera head 1_a transmits requests, lens parameters, and the like to the camera main unit 1_b through the three-wire serial driver 151a. The high-speed serial driver 150a serves to transmit data representing a taken image made of captured subject light to the camera main unit 1_b.

In the camera head 1_a, there are generated three types of image data: through image data that represents a through image (live view) of a subject currently present in a shooting angle of view and displayed on the LCD 28b of the camera main unit 1_b in response to receipt of subject light by the CCD 12a; still image data that represents a still image taken upon the press of the release button 21b; and moving image data that represents a moving image. The through image data is temporary data of low resolution, which is supplied to the camera main unit 1_b through the high-speed serial driver 150a as well as to an integration circuit 16a.

In addition, the camera head 1_a is provided with: the integration circuit 16a that detects brightness (Autoexposure (AE) detection) and contrast (Autofocus (AF) detection) of a subject; a power control section 140a that controls power supplied to each element of the camera head 1_a; and a DC/DC converter 101a that adjusts the power.

The mount connector 10a of the camera head 1_a is removably mounted on the mount 10b of the camera main unit 1_b. The camera head 1_a and the camera main unit 1_b communicate with each other via electric contacts provided in the mount connector 10a and the mount 10b. The mount connector 10a and the mount 10b are also each provided with a detection contact for detecting attachment/detachment of the camera head 1_a. The result of detecting attachment/detachment of the camera head 1_a is sent to a main unit CPU 100b through an I/O 141b of the camera main unit 1_b. The mount 10b of the camera main unit 1_b corresponds to an example of the "detection section" according to the invention.

Now, the camera main unit 1_b will be described.

The entire operation of the camera main unit 1_b is controlled by the main unit CPU 100b. Basically, the main unit CPU 100b gives an instruction to each element of the camera head 1_a and the camera main unit 1_b according to a processing mode selected by the mode setting dial 22b shown in FIG. 2. However, when the camera head 1_a is removed, the main unit CPU 100b switches the selected mode to a predetermined processing mode and gives operational instructions according to the predetermined processing mode. The switching of processing mode will be described later. The main unit CPU 100b corresponds to an example of each of the "data processing section" and the "mode switching section" according to the invention. The combination of the mode setting dial 22b and the main unit CPU 100b corresponds to an example of the "mode setting section" according to the invention.

The camera main unit 1_b is provided with: a system memory 101b in which a program is stored; a three-wire serial driver 151b for exchanging various kinds of requests and information with the camera head 1_a; a high-speed serial driver 150b that receives image data transmitted from the camera head 1_a; and a non-volatile memory 102b that records various kinds of parameters received by the three-wire serial driver 151b. The camera main unit 1_b is further provided with: a timer 110b for shooting; a calendar clock section 111b for controlling a calendar and a clock displayed on the LCD 28b; a USB driver 131b to which an external device such as personal computer is connected via the USB connector 29b; a switch/LED 132b that includes the mode setting dial 22b, cross key 24b, menu button 25b, execute button 26b, cancel button 27b shown in FIG. 3 and the like and operates under the control of the main unit CPU 100b via an I/O 133b. The camera main unit 1_b is further provided with: a flash section 121b for emitting flash light; a flash control section 120b that controls the amount of flash light emitted by the flash section 121b; a power switch 23b used to power on the camera system 1; a battery 142b that supplies power to the camera system 1; a power control section 140b that controls the power supplied from the battery 142b to each element of the camera main unit 1_b ; and a DC/DC converter 143b for adjusting the power. The camera main unit 1_b is further provided with: a digital signal processing section 109b that applies various kinds of processing such as compression processing to image data received by the high-speed serial driver 150b; a digital signal processing control section 103b that controls the digital signal processing section 109b; a frame memory 104b in which through image data received by the high-speed serial driver 150b is temporarily recorded; a LCD control section 105b that controls the display on the LCD 28b; the LCD 28b which displays images such as a through image based on through image data; and a memory card slot 107b in which a memory card 108b is inserted. Image data generated at the time of shooting is stored in this memory card 108b via a card I/F 106b after being compressed by the digital signal processing section 109b.

The camera system 1 according to the embodiment is basically configured as described above.

The camera system 1 according to the embodiment allows a user to change the selected mode (processing mode selected by the mode setting dial 22b) by rotating the mode setting dial 22b to select a mode from among the playback mode (Play), still-image mode (Cam), moving-image mode (Mov), connection mode (Pc) and set-up mode (SetUp) indicated in this order. Basically, a mode selected by the mode setting dial 22b is established as an actual processing mode. However, for example, when the camera head 1_a is removed from the camera main unit 1_b, the selected mode is automatically switched to a predetermined processing mode. The relationship between the attachment/detachment of the camera head 1_a and the processing mode will be described below.

Figure 5:
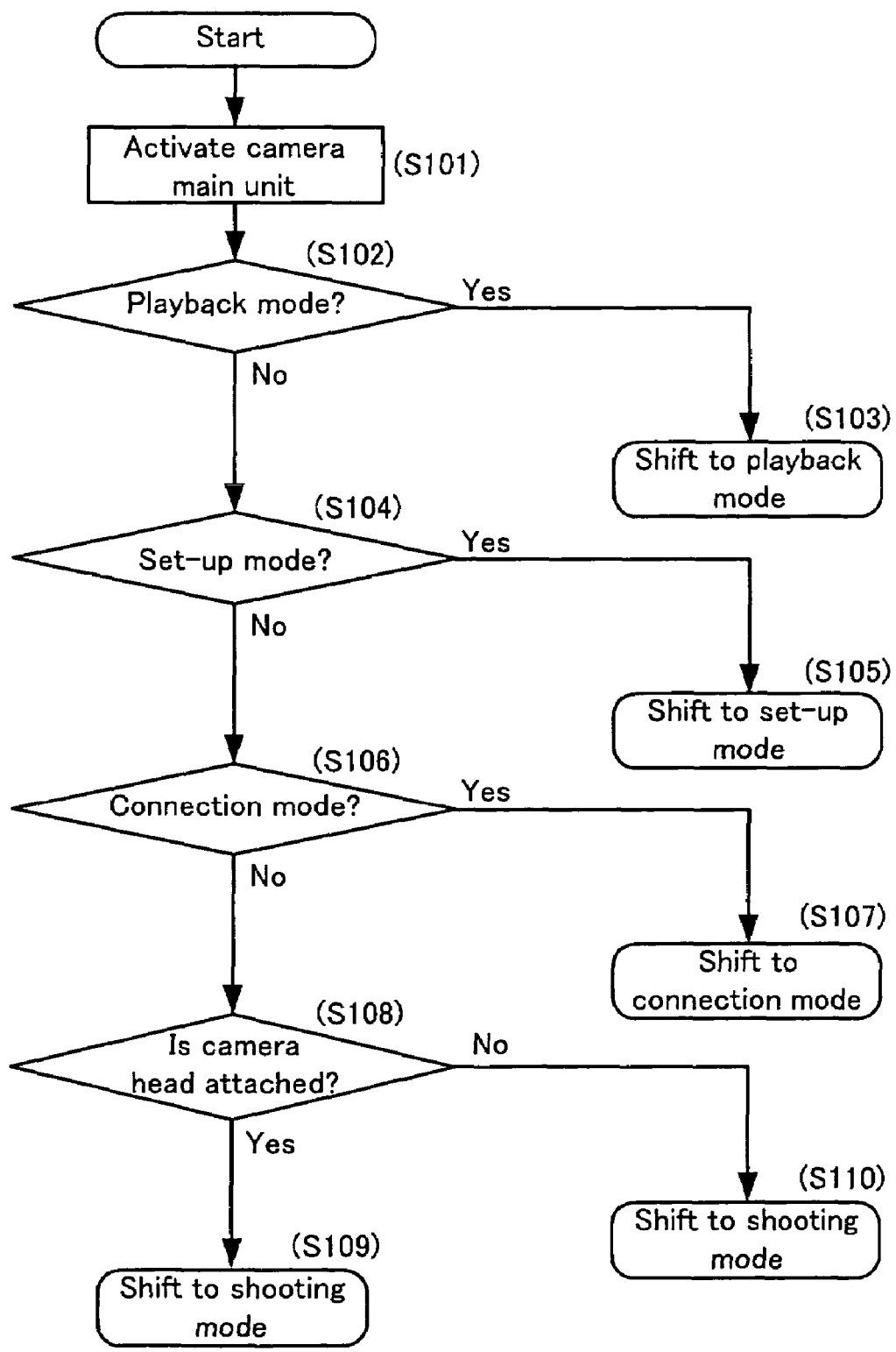
FIG. 5 is a flowchart showing a processing flow from the activation of the camera main unit 1_b to the setting of a processing mode.

FIG. 5 is a flowchart showing a processing flow from the activation of the camera main unit 1_b to the setting of a processing mode.

First, when a user shifts the power switch 23b of the camera main unit 1_b to the ON position, the power control section 140b supplies power accumulated in the battery 142b to each element of the camera main unit 1_b, thereby activating the camera main unit 1_b (step S101 in FIG. 5).

Upon the activation of the camera main unit 1_b, the main unit CPU 100b obtains a mode selected by the mode setting dial 22b and whether the playback mode is selected or not is determined in step S102.

If it is determined that the playback mode is selected (Yes in step S102), the playback mode is established as a processing mode (step S103). In this playback mode, a user can view a multi-frame screen on the LCD 28b composed of a set of images stored in the memory card 108b and select one of the displayed images on the screen so that the selected image is displayed on the LCD 28b.

If the playback mode is not selected (No in step S102), the flow proceeds to step S104 to determine whether the set-up mode is selected or not. If the set-up mode is selected (Yes in step S104), the set-up mode is established as a processing mode (step S105). In the set-up mode, a set-up screen stored beforehand in the non-volatile memory 102b appears on the LCD 28b, which allows a user to set values such as the time of the calendar clock section 111b by entering the values on the set-up screen.

If the set-up mode is not selected (No in step S104), the flow proceeds to step S106 to determine whether the connection mode is selected or not. If the connection mode is selected (Yes in step S106), the connection mode is established as a processing mode (step S107). Once the connection mode is established, the camera main unit 1_b can exchange data with an external device via the USB connector 29b of the USB driver 131b.

If the connection mode is not selected (No in step S106), that is, the still-image mode or the moving-image mode (the still-image mode and moving-image mode are hereinafter collectively referred to as "shooting mode") is selected, the attachment/detachment state of the camera head 1_a is determined in step S108. If the camera head 1_a is attached (Yes in step S108), either the still-image mode or the moving-image mode selected by the mode setting dial 22b is established as a proceeding mode (step S109). In the shooting mode, image data is generated when subject light is read by the CCD 12*a* of the camera head 1_a.

If the camera head 1_*a* is not attached (No in step S108), the playback mode is established as a processing mode (step S110). In the state of step S110, the mode selected by the mode setting dial 22*b* and that established inside the camera system 1 are different. In this way, a processing mode other than the shooting mode is set when the camera head 1_*a* is not attached. This makes it possible to prevent a user from missing the right moment to shoot an image by pressing the release button 21*b* without being aware of the camera head being removed.

After the camera main unit 1_*b* is activated and then a processing mode is set, if the camera head 1_*a* is attached (for example, if the camera head 1_*a* is attached after steps S103, S105, S107 and S110 in FIG. 5), the set processing mode remains as it is.

It is assumed here that the user removes the camera head 1_*a* from the camera main unit 1_*b* and attaches another camera head as desired other than the camera head 1_a, for example, in order to change the value in the zoom range or the like during shooting. In this situation, the user is very likely to restart the shooting after changing the camera head 1_*a* and therefore a quick restart of the shooting is desired. In view of such a situation, the camera main unit 1_*b* of the embodiment is configured to shift to a standby state (standby for attachment of a camera head) upon detachment of the camera head 1_*a* during the shooting mode being set as the processing mode and to shift from the standby state back to the shooting mode upon attachment of another camera head.

Figure 6:
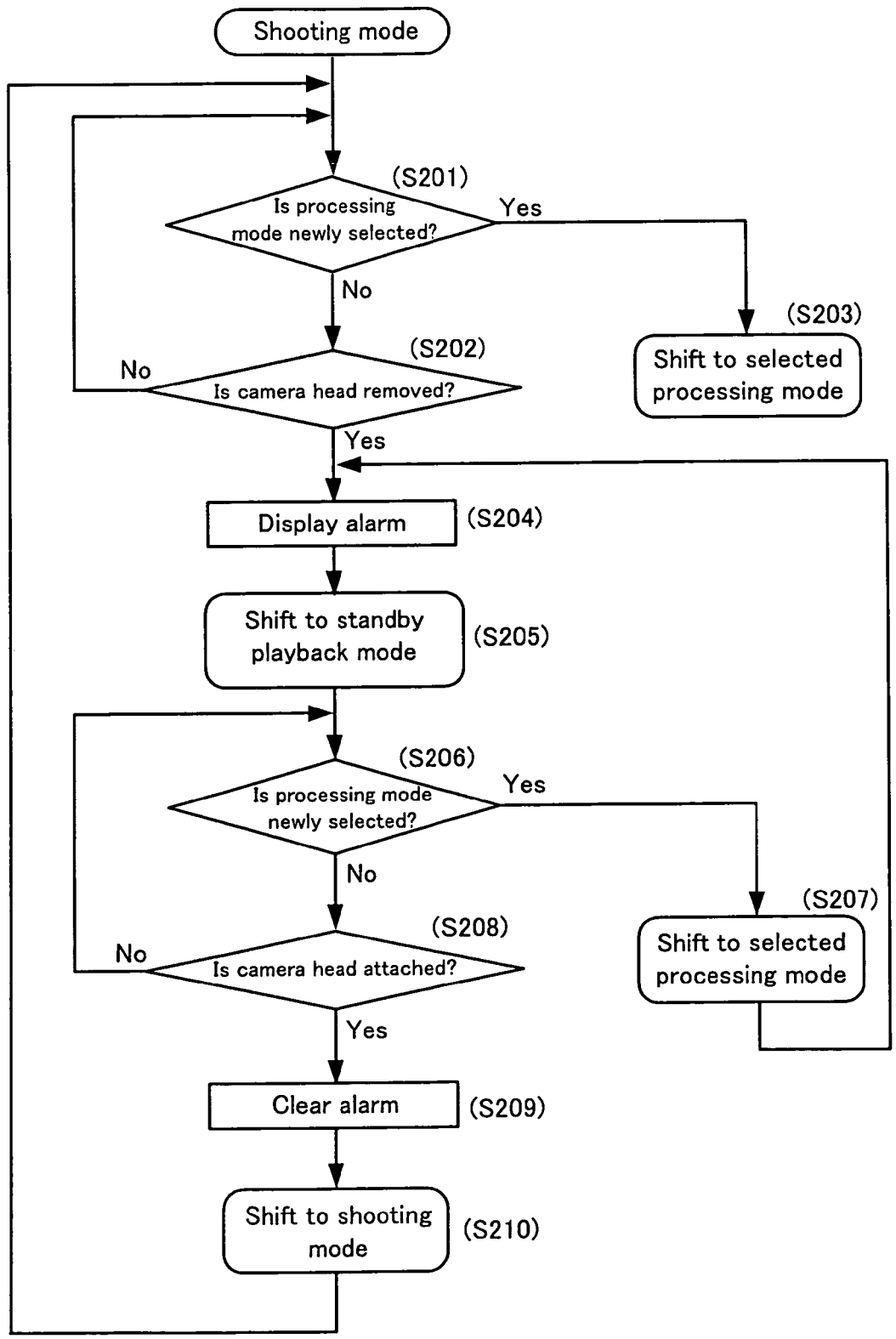
FIG. 6 is a flowchart showing a processing flow performed when the camera head 1_a is detached and then attached while a shooting mode is set.

FIG. 6 is a flowchart showing a processing flow performed when the camera head 1_*a* is detached and then attached while a shooting mode is set.

In the state in which the shooting mode is set, if a user selects a mode other than the shooting mode by rotating the mode setting dial 22*b* (Yes in step S201), the current processing mode is changed to the selected mode (step S203).

Figure 7:
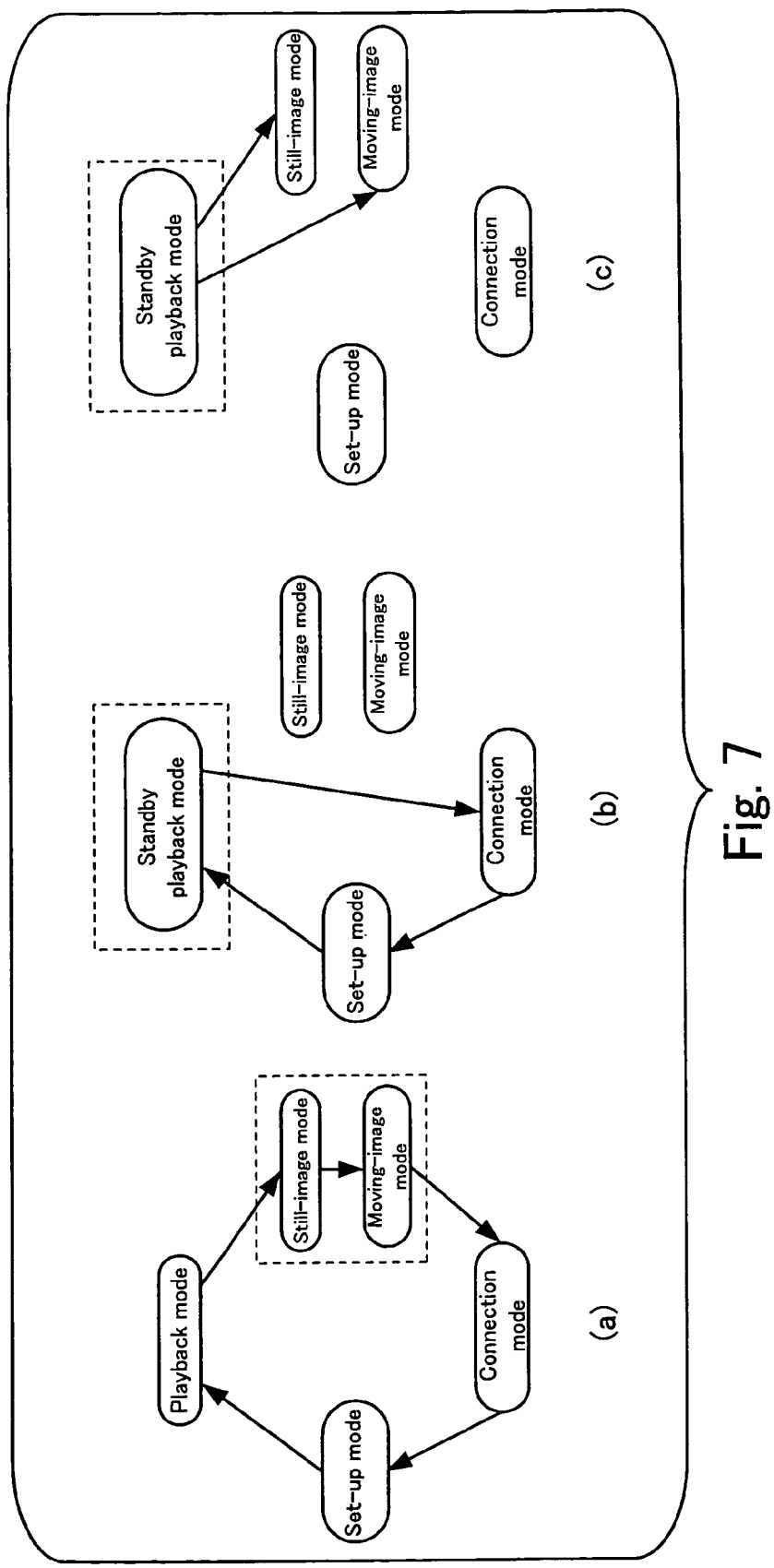
FIG. 7 is a state transition diagram of the processing mode.

FIG. 7 is a state transition diagram of the processing mode. The description of the flowchart in FIG. 6 will be continued with reference to FIG. 7.

The transition starts from a processing mode surrounded by a dashed line. In this example, it is assumed that the mode setting dial 22*b* is rotated in a clockwise direction only (the playback mode, still-image mode, moving-image mode, connection mode and set-up mode can be sequentially set in this order). As shown in part (a) of FIG. 7, in the state in which the still-image mode or the moving-image mode is set as a processing mode, it is possible to change the current mode to any of the connection mode, and set-up mode and playback mode by rotating the mode setting dial 22*b*.

If the shooting mode remains same (No in step S201 in FIG. 6), the flow proceeds to step S202 where it is determined whether the camera head 1*a* is detached from the camera main unit 1_*b* or not. If the camera head 1_*a* is detached (Yes in step S202), an alarm message saying "camera head is not attached" appears on the LCD 28*b* (step S204). In this way, a user is informed of the camera head 1_*a* being removed during the shooting mode. This makes it possible to prevent a user from pressing the release button 21*b* in the state of the camera head 1_*a* being removed.

Inside the camera main unit 1*b*, the processing mode is changed to the playback mode on standby for attachment of a camera head (at step S205). In this playback mode, the processing of the normal playback mode is performed. However, when another camera head is attached to the camera main unit 1_*b* in this state, the playback mode is switched back to the shooting mode, the processing mode set immediately before the shift to the playback mode. In this way, the camera main unit 1_*b* is configured to forcibly switch to any of processing modes other than the shooting mode upon removal of the camera head 1_a, thereby further ensuring that shooting does not take place in the state when the camera head 1_*a* is removed.

In the stage at step S205, the shooting mode is selected by the mode setting dial 22*b* while the standby playback mode is established as the processing mode. In this state, if a user selects a mode other than the shooting mode by rotating the mode setting dial 22*b* (Yes in step S206), the processing mode is changed to the selected mode and the message displayed on the LCD 28*b* disappears (step S207). Subsequently, if the user selects again the shooting mode as a processing mode by rotating the mode setting dial 22*b*, the flow goes back to step S204 and the alarm message saying "camera head is not attached" appears again on the LCD 28*b*.

When the shooting mode remains selected by the mode setting dial 22*b* (No in step S206), upon attachment of another camera head to the camera main unit 1_*b* (Yes in step S208), the alarm message saying "camera head is not attached" disappears from the LCD 28*b* (step S209).

Subsequently, the processing mode is switched from the standby playback mode back to the shooting mode (still-image mode or moving-image mode) set before the shifting of the processing mode in step S205 (step S210). In this stage, as shown in part (c) of FIG. 7, the processing mode is forcibly changed back to the shooting mode set before the removal of the camera head 1_a. This enables a user to restart the shooting immediately after attaching another camera head, saving time and effort to select a processing mode again using the mode setting dial 22*b*.

As described above, according to the camera system of the embodiment, it is possible to prevent occurrence of an undesirable situation in which a user presses the release button in the state when the camera head is removed, and also to smoothly carry out shooting even if the camera head is changed during the shooting.

In the above description, the camera head having both an imaging device and an image-taking optical system incorporated therein is used as an example of the optical unit of the invention. However, the optical unit of the invention is not limited to this example and may be one having no imaging device. In this case, the imaging device may be provided in a camera main unit or in an adaptor connecting the camera main unit with the optical unit.

Further, in the above description, the LCD displaying a message saying that the optical unit is removed is used as an example of the notification section of the invention. However, the notification section of the invention is not limited to this example and may be the one employing a voice message and the like instead of the message.

Furthermore, in recent years, there have been developed liquid lenses having a container filled with liquid and capable of controlling the refractive index of light by applying voltage to the liquid to change the shape and the like of the liquid surface. In the above description of the embodiment, a usual lens is used as an example of the image-taking optical system of the invention. However, the image-taking optical system of the invention is not limited to this example and may be one of such liquid lenses. In this case, application of voltage to the liquid corresponds to "driving of the image-taking optical system" in the above description, which causes an effect similar to the movement of the typical lens in a direction along the optical axis.

What is claimed is:

1. A camera system comprising: an optical unit having an image-taking optical system passing subject light; and a camera main unit to which the optical unit is detachably attached, wherein:

the camera main unit comprises:

a detection section which detects attachment and detachment of the optical unit;

a data processing section which applies predetermined processing to image data representing an image of subject light passing through the image-taking optical system of the optical unit and which has a plurality of modes including a shooting mode for obtaining the image data;

a mode setting section which sets a mode of the data processing section according to an operation; and a mode switching section which switches a mode of the data processing section to a mode other than the shooting mode thereby entering a standby state when detachment of the optical unit is detected by the detection section during the shooting mode being set by the mode setting section, and which switches a mode of the data processing section back to the shooting mode when attachment of the optical unit is detected by the detection section during the standby state.

2. A camera system according to claim 1, wherein the camera main unit further comprises a notification section which notifies to the outside of the camera system that the optical unit is detached, in response to a setting operation for setting the shooting mode through the mode setting section.

3. A camera system according to claim 1, wherein the mode switching section disables the mode setting section from setting the shooting mode during the standby state.

* * * * *